United States Patent [19]
Yamada et al.

[11] Patent Number: 6,116,887
[45] Date of Patent: Sep. 12, 2000

[54] FOAM MOLDING EQUIPMENT

[75] Inventors: Yuichi Yamada, Toyohashi; Osamu Shimomura, Anjo; Masaki Yonezawa; Hirozi Kamiya, both of Toyota; Ken Ohshima, Nishikamo, all of Japan

[73] Assignee: Aisin Takaoka Co., Ltd., Toyota, Japan

[21] Appl. No.: 09/024,219

[22] Filed: Feb. 17, 1998

[30] Foreign Application Priority Data

Feb. 17, 1997 [JP] Japan ..................................... 9-031950

[51] Int. Cl.$^7$ ............................ B29C 33/22; B29C 33/30
[52] U.S. Cl. ................. 425/186; 425/817 R; 425/192 R; 425/195; 425/450.1
[58] Field of Search ..................................... 425/186, 4 R, 425/817 R, 192 R, 195, 450.1, 451.9, 542

[56] References Cited

U.S. PATENT DOCUMENTS

| | | | |
|---|---|---|---|
| 3,679,340 | 7/1972 | Springs ..................................... | 425/186 |
| 4,472,127 | 9/1984 | Cyriax et al. ............................. | 425/186 |
| 4,482,306 | 11/1984 | Hahn ........................................ | 425/4 R |
| 4,518,338 | 5/1985 | Hehl ......................................... | 425/186 |
| 4,555,228 | 11/1985 | Nishike et al. .......................... | 425/186 |
| 4,824,732 | 4/1989 | Hendry et al. ........................... | 425/4 R |
| 5,002,711 | 3/1991 | Iwama et al. ............................ | 425/195 |
| 5,085,814 | 2/1992 | Kamiyama et al. ..................... | 425/4 R |
| 5,370,515 | 12/1994 | Bazzica .................................... | 425/4 R |
| 5,580,587 | 12/1996 | Leonhartsberger et al. ............ | 425/186 |

FOREIGN PATENT DOCUMENTS

| | | |
|---|---|---|
| 585-8344 | 3/1980 | Japan . |
| 55-17695 | 5/1980 | Japan . |
| 59-28169 | 7/1984 | Japan . |
| 61-175434 | 11/1986 | Japan . |
| 6-71771 | 3/1994 | Japan . |

*Primary Examiner*—Robert Davis
*Assistant Examiner*—Thukhanh T. Nguyen
*Attorney, Agent, or Firm*—Burns, Doane, Swecker & Mathis, LLP

[57] ABSTRACT

The present invention provides foam molding equipment which has an advantage in performing exchange of a molding dies within a short time period and in improving productivity thereof, and which is most suitable, in particular, to the case of using upsized molding dies. The equipment is provided with a fixed die base 21, movable die base 8, a die opening/closing mechanism to move the movable die base 8 together with a movable die 12, and a base frame 1. The fixed die base 21 is detachable from the base frame 1. Molding dies comprising a stationary die 11 and a movable die 12 is preliminarily attached to the fixed die base 21 to form a unit 20. The base frame 1 is provided with a loading surface 4 to load the unit 20 and a unit connector 27 to fix the unit loaded on the loading surface 4 to the base frame 1. The unit 20 is loaded on the loading surface 4 in a detachable manner.

15 Claims, 7 Drawing Sheets

FOAM MOLDING EQUIPMENT

FIELD OF THE INVENTION

The present invention relates to a molding equipment, particularly, a foam molding equipment which can produce foamed goods by heating and foaming thermoplastic beads (hereinafter referred to as "resin particles") in a molding cavity of molding dies, more particularly, to equipment which has an advantage in shortening time required for exchange of a large-sized die.

BACKGROUND OF THE INVENTION

Conventional equipment which produces a foamed product by heating and foaming resin particles in a molding cavity of a molding dies has been known (as disclosed in JP Patent Kokoku JP-B-55-17695[1980] and JP-B-55-8344 [1980]).

Such known conventional foam molding equipment is shown in FIG. 7, which is provided with a fixed plate 100, fixed die base 200, a plurality of die bars 300 disposed between the fixed plate 100 and the fixed die base 200, movable die bar base 400 which can be moved along the die bars 300, die opening/closing mechanism 500 supported by the fixed plate 100, and a base frame 600 which serves to support the fixed die base 200, movable die bar base 400 and die opening/closing mechanism 500.

To fix molding dies to said foam molding equipment, the molding dies 700 with a stationary die 701 and a movable die 702 clamped together are hung by a crane 800. The molding dies 700 are then inserted into the space between the fixed die base 200 and the movable die base 400 in the direction of the arrow F1 to be installed. The stationary die 701 is then bolted on the fixed die base 200 and the movable die 702 is bolted on the movable die base 400 as well.

Moreover, in such foaming equipment, a plurality of charging guns 900 to be used for supplying resin particles to the molding cavity is attached manually to the stationary die 701 by having the charging guns passed through open paths of the fixed die base 200.

SUMMARY OF THE DISCLOSURE

In the course of investigations aiming at the present invention, following problems have been encountered.

In the foam molding equipment described above, much time is required to exchange the molding dies 700. Especially, when a large-sized foamed (molded) product is produced by molding dies, the molding dies 700 which is upsized and made heavy is required accordingly, as a result, making such exchange of the molding dies 700 so troublesome and time-consuming.

Additionally, because a plurality of the charging guns 900 for supplying resin particles are generally attached to the stationary die 701 manually, the attaching work requires much time. If large-sized foamed products, in particular, are produced by the molding dies, because the number of the charging guns must be as large as 10 to 20 to correspond to the large-sized molding dies, another time is also required for exchange of such charging guns. As hereinabove described, in said foam molding equipment, time is required to exchange the molding dies 700, imposing a limitation on production level.

Therefore, it is an object of the present invention to provide a novel foam molding equipment taking into account these considerations described above. Concretely, it is an object of the present invention to provide a foam molding equipment which has an advantage in shortening time required for exchange of the molding dies and serves to improve productivity thereof.

Especially, it is a further object of the present invention to provide a foam molding equipment which is most suitable to the case of using an upsized and heavier molding dies.

According to the present invention, generally, the foam molding equipment is so constructed that a stationary die is separated from a base frame and the molding dies made up of a stationary die and movable die is detachably attached to a fixing (first) die base to form a unit.

Still further objects of the present invention will become apparent in the entire disclosure.

(1) According to a first aspect of the present invention, there is provided a novel foam molding equipment.

The foam molding equipment generally comprises:
molding dies composed of a stationary die and a movable die with a molding cavity; a fixing die base to which the stationary die is attached; a movable die base to which said movable die is attached opposing to the fixing die base. The equipment further comprises die opening/closing mechanism which moves the movable die base together with the movable die in die opening and closing directions of the movable die; and a base frame in which said fixing die base, said movable die base and said die opening/closing mechanism are installed, wherein the equipment is so constructed that the fixed die base is separable from the base frame.

The molding dies are detachably attached to the fixing die base to form a unit. The base frame is provided with a loading surface having a horizontal loading surface to load the unit and a unit connecting means to fix, in a detachable manner, the unit loaded on the loading surface to the base frame; and the unit is loaded, in a detachable manner, on the loading surface of the base frame.

In this equipment, the fixing die base is so configured to be separated from the base frame and the molding dies (pair) are attached to the fixing die base to form the unit. To exchange the molding dies, the unit with the molding dies attached thereto as a whole is loaded on the loading surface to the base frame. Then, the unit on the loading surface is fixed in a detachable manner to the base frame using a unit connecting means. By doing this, the unit is loaded on the unit.

The foam molding equipment has an advantage in shortening time required for exchange of the molding dies because the molding dies is preliminarily attached to the fixing die base to form the unit and is then attached to the base frame in a state of the unit as a whole. Therefore, even in the case of upsized and heavier molding dies, the advantageous reduction of time required for exchange is possible as well. In the case of a plurality of the molding dies to be used, preferably, multiple units composed of the fixed die base provided corresponding to each molding dies and with the molding dies attached thereto in advance are prepared in advance.

(2) According to a second aspect, the foam molding equipment is featured in that its fixing die base is provided with a horizontal floor member to be loaded on a loading surface of the base frame, a portion elected vertically to the horizontal floor member and which has reverse T-shaped side face.

Also, in this equipment, because the side face of its fixed die base is of a reverse T-shaped configuration, the stability in the configuration of the fixing die base is obtained. Accordingly, during the movement of the unit with the molding dies being attached to the fixing die base, the unit can be kept stable. More advantageous reduction of time required for exchange of the molding dies (set) can be achieved as well.

(3) According to a third aspect, there is provided a foam molding equipment featured in that it is provided with a resin particle charging assembly to be used for supplying resin particles into the molding cavity. The assembly comprises a supply system on the base frame side which is attached to the base frame and which receives resin particles from a resin particle source, and another supply system on the unit side which is also attached to the unit and which can communicate with said supply system on the base frame when the unit is loaded on the loading surface of the base frame.

In this equipment, when the unit is adequately loaded on the loading surface on the side of the base frame, the supply system on the unit side is automatically connected to the supply system on the base frame side and the supply system on the unit side of the unit communicates with the supply system on the base frame side accordingly. That is, automatic or approximately automatic connection is achievable herein. Therefore, resin particles transferred from the resin particle source can be supplied into the molding cavity of the molding dies through the supply system both on the base frame side and on the unit side. Thus, this equipment has an advantage in discontinuing or simplifying troublesome operation of manually connecting such a supply system on the unit side to that on the base frame side one by one, thus making easier the exchange of the molding dies and improving productivity thereof.

Also, in this equipment, when the unit is detached from the loading surface of the base frame, the supply system on the unit side is also automatically detached from the supply system on the base frame. That is, by doing this, automatic or approximately automatic detachment is achievable, i.e, the equipment has an advantage in discontinuing or simplifying troublesome work of manual detaching.

(4) According to a fourth aspect, the foaming equipment is featured as follows:

The supply system on the base frame side of the resin particle charging assembly is provided with a first material passage which opens at the loading surface of the base frame and the supply system on the unit side of the resin particle charging assembly is provided with a second material passage which opens at the lower face of the fixing die base of the unit as well and communicates with the first material passage when the unit is loaded on the unit, and resin particles are supplied into the molding cavity of the molding dies through the first and second material passages.

In this equipment, when the unit is adequately loaded on the loading surface of the base frame, the second material passage of the fixing die base of the unit communicates with the first material passage on the loading surface of the base frame. Therefore, resin particles can be supplied to the molding cavity of the molding dies through the first and second material passages which communicate with each other.

(5) According to a fifth aspect, there is provided a further foam molding equipment featured as follows:

The circumferential portion of the first material passage is provided with sealing materials to be used to seal the fixing die base of the unit by being closely adhered on the lower face thereof when the unit is loaded on the loading surface.

In this aspect, when the unit is adequately loaded on the loading surface, the sealing materials are closely adhered to the lower face of the fixing die base of the unit. As a result, sealing between the first and second material passages is secured thereby. Thus, the foam molding equipment has an advantage in preventing leak and the like and in supplying resin particles smoothly through the first and second material passages.

(6) According to a sixth aspect, there is provided a foam molding equipment featured as follows:

The base frame has a unit positioner connected to the unit used to position the unit on the loading surface and a unit elevating means used to keep the unit in a state that it can be always elevated or lowered and to have the unit lowered following the positioning and to load the fixing die base on the loading surface of the base frame.

According to this aspect, the unit positioner is connected to the unit, thereby allowing the positioning of the unit on the loading surface. In addition, after the completion of positioning the unit, the unit elevating means is used to lower the unit and to load the fixing die base on the loading surface of the base frame. Thus, the equipment has an advantage in loading the unit which is exactly positioned on the base frame.

Further aspects of the invention will become apparent from the entire disclosure and claims.

PREFERRED EMBODIMENT OF THE INVENTION

The embodiment of the present invention will be described with reference to FIGS. 1–6. In this embodiment, foam molding equipment is so configured that upsized foamed products can be formed and which can also perform a tie-bar-less operation wherein the use of tie bars is abolished.

Figure 1:
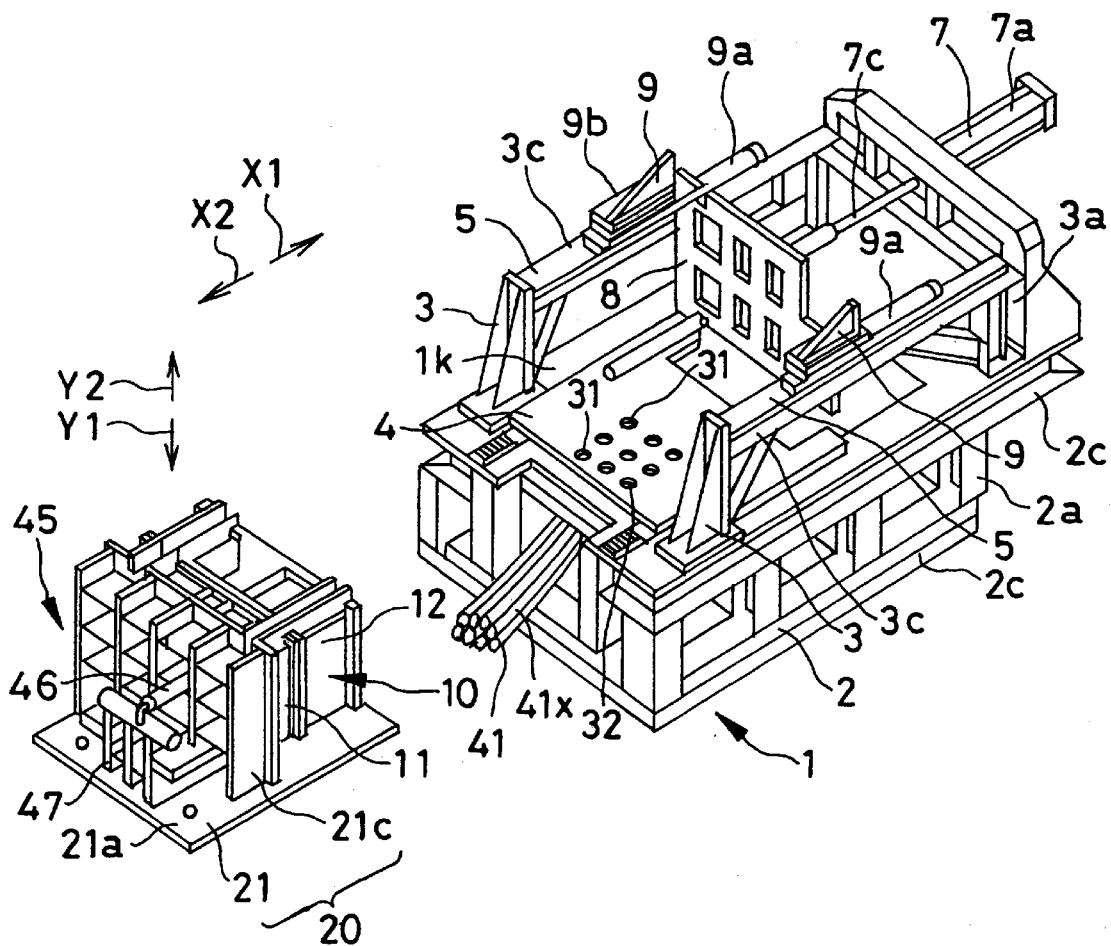
FIG. 1 is a conceptual perspective view schematically showing an embodiment of a whole foam molding equipment.
Figure 2:
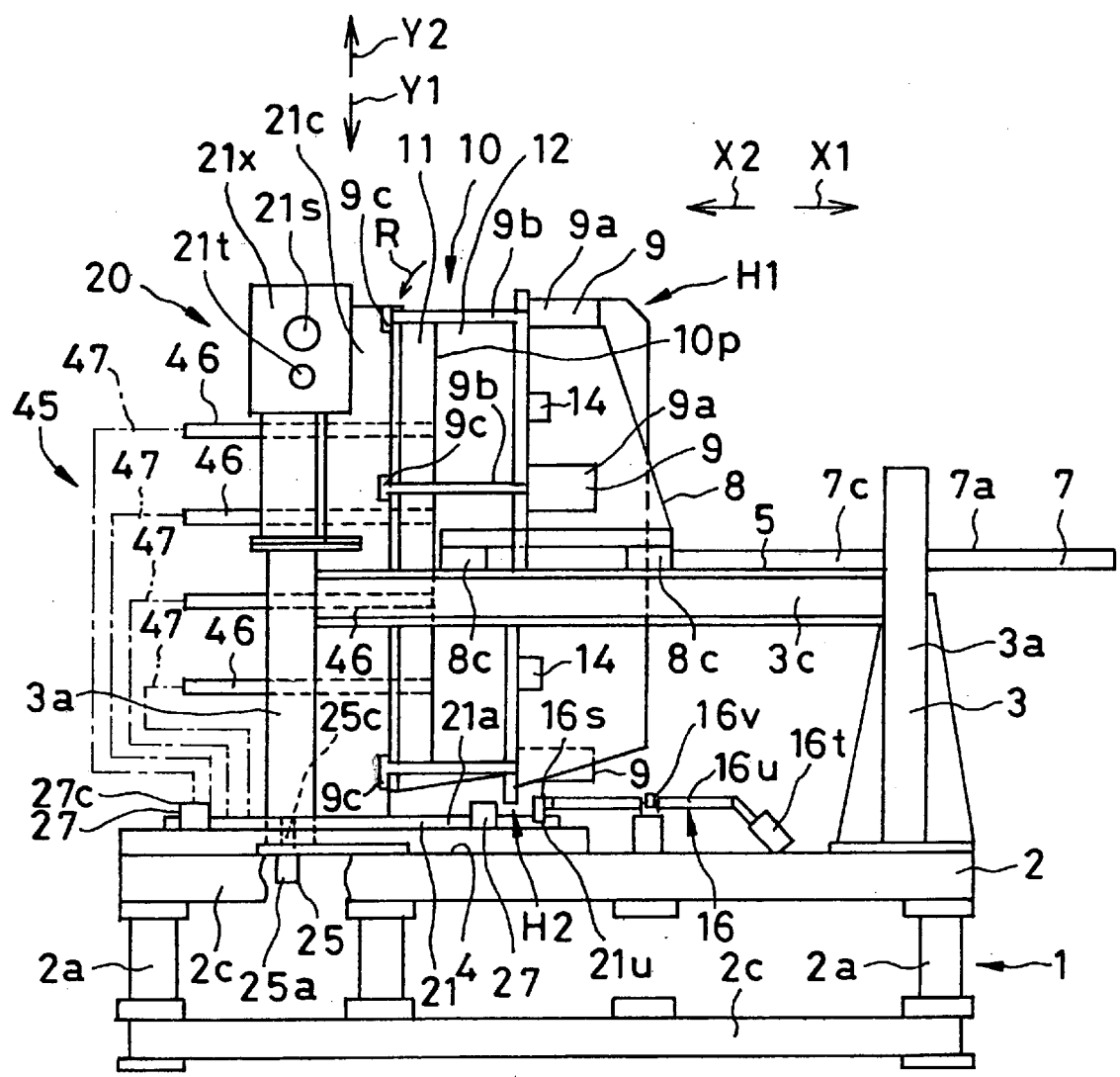
FIG. 2 is a side view schematically showing the whole foam molding equipment.
Figure 3:
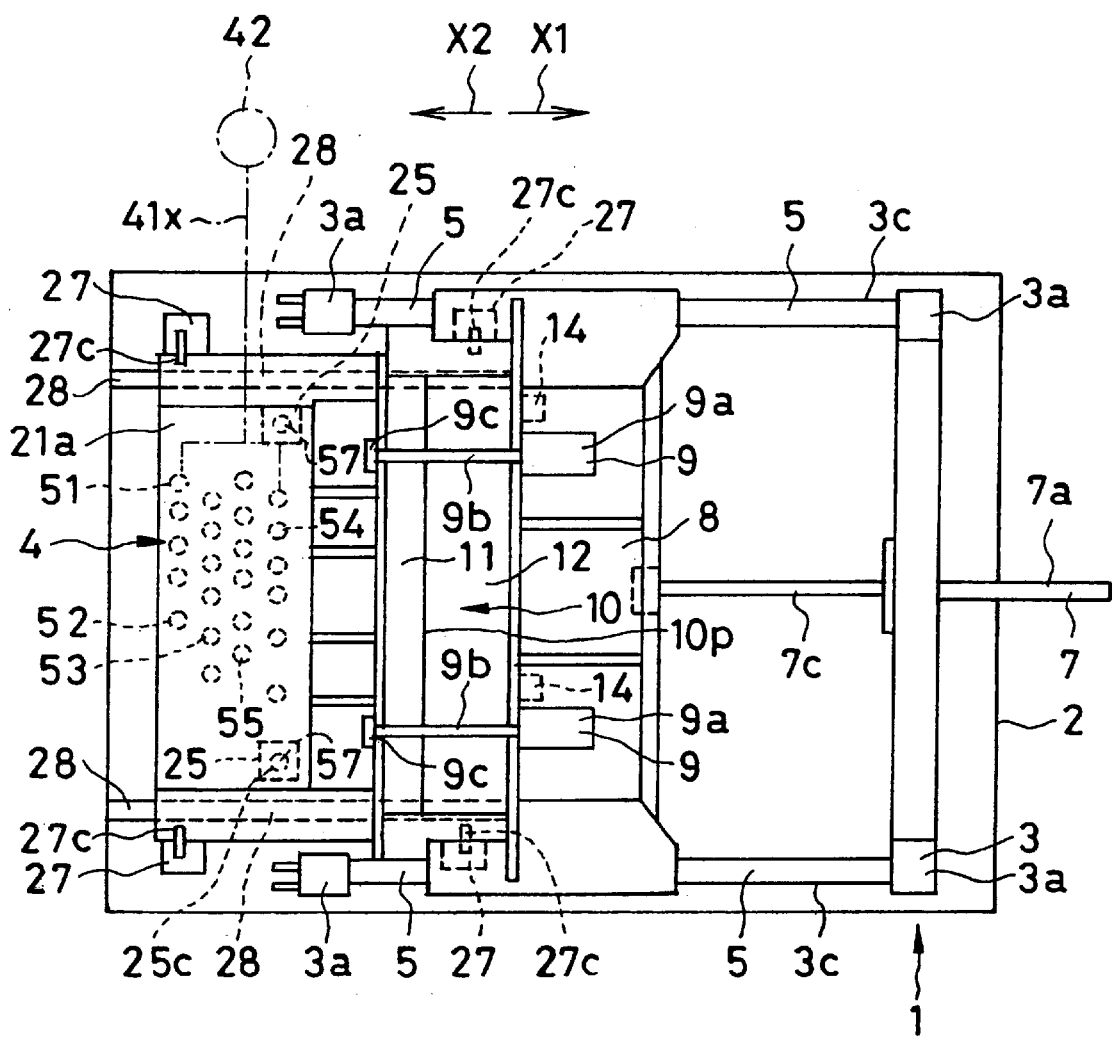
FIG. 3 is a plan view schematically showing the whole foam molding equipment.

FIG. 1 is a perspective view of a whole equipment. FIG. 2 is a side view of the whole equipment. FIG. 3 is a plan view of the whole equipment. FIG. 6 shows the state of the equipment wherein exchange is in the middle course. FIGS. 1–6 are only conceptual diagrams which are basically common in other diagrams, however, there may be some detailed parts not conforming exactly to those in other diagrams.

As is discernible from FIG. 2, a base frame 1 of a foam molding equipment is provided with a lower frame 2 having longitudinal lower columns 2a and transverse lower columns 2c and with an upper frame 3 having longitudinal higher columns 3a and transverse higher columns 3c. A loading surface 4 with a horizontal face is placed on a lower frame 2 of the base frame 1. On the loading surface 4, a unit 20 described later is detachably loaded. On each of the transverse higher columns 3c of the upper frame 3, a guide rail 5 is provided in such a manner that it extends in the die opening/closing directions, i.e., in the directions of the arrows X1 and X2. Moreover, the upper frame 3 of the base frame 1 is provided with a die opening/closing mechanism 7. The die opening/closing mechanism 7 has a hydraulic cylinder 7a and a cylinder rod 7c which moves forward and back by the hydraulic cylinder 7a. The cylinder rod 7c of the die opening/closing mechanism 7 is coupled to a movable die base 8. When the die opening/closing mechanism is driven, the movable die base 8 moves along the guide rail 5 in the die opening/closing directions, i.e., in the directions of the arrows X1 and X2. Therefore, as is also discernible from FIGS. 1 and 2, the movable die base 8 is to be attached in advance to the base frame 1.

As shown in FIG. 2, on the side of the movable die base 8, 2 pcs of guide portions 8c, also called a "LM guide", used to move the die base smoothly is provided. As the guide portions 8c are loaded on the guide rail 5, they can move along the guide rail 5 when the movable die base 8 moves. Also as shown in FIG. 2, the guide rail 5 is positioned at an approximately intermediate height between the highest point H1 and the lowest point H2 of the movable die base.

With reference to FIGS. 2 and 3, the movable die base 8 has a plurality of die clamping means 9. These die clamping means 9 are used to secure die clamping of a stationary die 11 and movable die 12 which both constitute molding dies at the time of foam molding, and which have a hydraulic drive assembly 9a, rods 9b which is swung by the hydraulic drive assembly 9a in the direction of the arrow R (see FIG. 2) and connecting nails 9c connected to an edge of the rods 9 and are coupled, when being swung, to the stationary die 11. The reference number 10p in FIG. 2 shows a split face between the stationary die 11 and movable die 12.

In the embodiment, to meet the requirement in an upsized and heavier molding dies 10, the die opening/closing function in the directions of the arrows X1 and X2 the movable die 12 is performed by the die opening/closing mechanism 7 and the die clamping function for the stationary die 11 and movable die 12 of the closed molding dies 10 is performed by a plurality of die clamping means separately. Thus, even in the case of the upsized and heavier molding dies 10 and of tie-bar-less type foam molding equipment, by separation into two functions including die opening/closing function and clamping function, clamping of the molding dies 10 (clamping force) is advantageously secured while the upsizing of the die opening/closing mechanism 7 is prevented.

The movable die base 8 is provided with a plurality of movable die supporting portions 14. The movable die supporting portion 14 is used to detachably fix a movable die 12 constituting one of the nolding dies(generally, pair) to a movable die base 8.

As is discernible from FIG. 2, a lower frame 2 of the base frame 1 is provided with a transfer portion 16. The transfer portion 16 comprises a hydraulic cylinder 16u connected to a pivot 16v and attached to the end of a cylinder rod which is used to move a connecting nail 16s in the directions of the arrows X1, X2 and another hydraulic cylinder 16t connected to the hydraulic cylinder 16u and a lower flame 2 which is used to rotate the hydraulic cylinder 16u around the pivot 16v and to move the connecting nail 16s in the directions of the arrows Y1 and Y2. When the hydraulic cylinder 16u is then driven while the connecting nail 16s is being connected to a connecting portion 21u of the fixing die base 21, a fixing die base 21 of a unit 20 is drawn toward the arrow X1 direction.

With continuous reference to FIGS. 2 and 6, the lower frame 2 of the base frame 1 is provided with a unit positioner 25. The unit positioner 25 has a hydraulic cylinder 25a and a positioning pin 25c lifted and lowered by the hydraulic cylinder 25a in the directions of the arrows Y2 and Y1.

The unit positioner 25 fits into a fixed die base 21 of the unit 20 to exactly position the unit on the loading surface 4 of the base frame.

With further continuous reference to FIG. 6, the lower frame 2 of the base frame is provided with unit coupling means 27. The unit coupling means 27 is composed of hydraulic cylinder 27a and a clamp nail 27c which is activated by a hydraulic cylinder 27a. The unit coupling means(coupler) 27 is used to clamp a horizontal floor (member) 21a of a fixed die base 21 included in a unit 20 loaded on the loading surface and to fix it on the loading surface of the base frame in a detachable manner.

Referring to FIG. 6, the lower frame 2 of the base frame 1 is provided with a unit elevating means 28. The unit elevating means 28 contains a plurality of cylinders 28s having a cylinder rod 28r and a transverse column shaped elevating portion 28u which can move in the directions of the arrows Y2 and Y1. As is discernible from FIG. 6, when the cylinder 28s is activated, the elevating portion 28u moves up and down in the directions of the arrows Y2 and Y1. The elevating portion 28 is provided with a roller table 28w.

Figure 4:
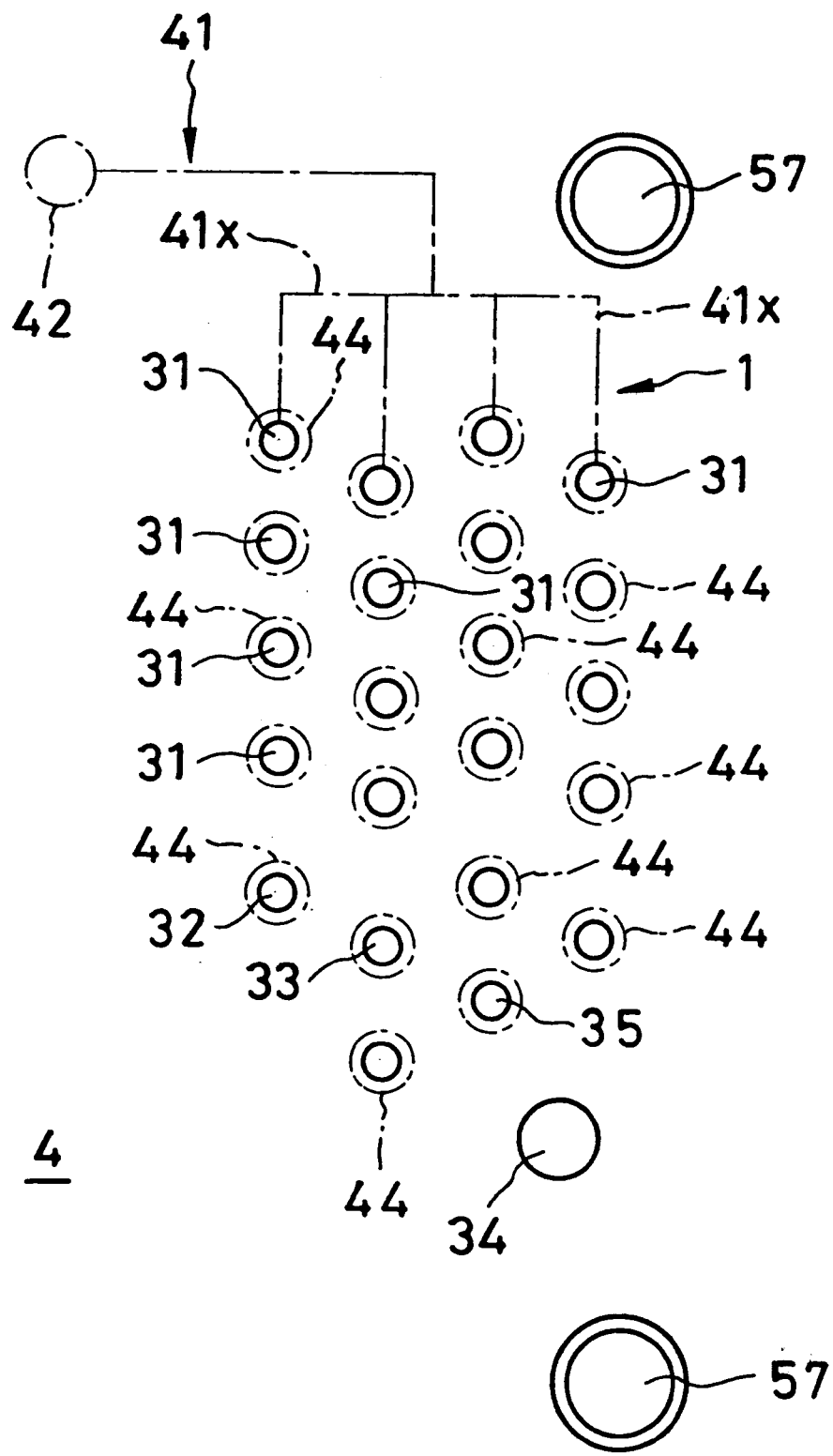
FIG. 4 is a plan view illustrating the vicinity of a first material passage on a loading surface.

FIG. 4 is a fragmentary plan view of a loading surface 4. As shown in FIG. 4, a plurality of first material passages 31 used to supply resin (particles) to a charging gun 46 described later are open on the loading surface 4 of the base frame 1. Additionally, a first charging air passage 32 used to supply auxiliary air to a charging gun 46, first actuating air passages 33 (for example, 3 passages) used to supply air to activate the charging gun 46, first drain passage 34 used to discharge heated vapor or cooling water passed through the inside of the molding dies 10 and first pilot passage 35 used to supply pilot air are open similarly on the loading surface 4.

Figure 5:
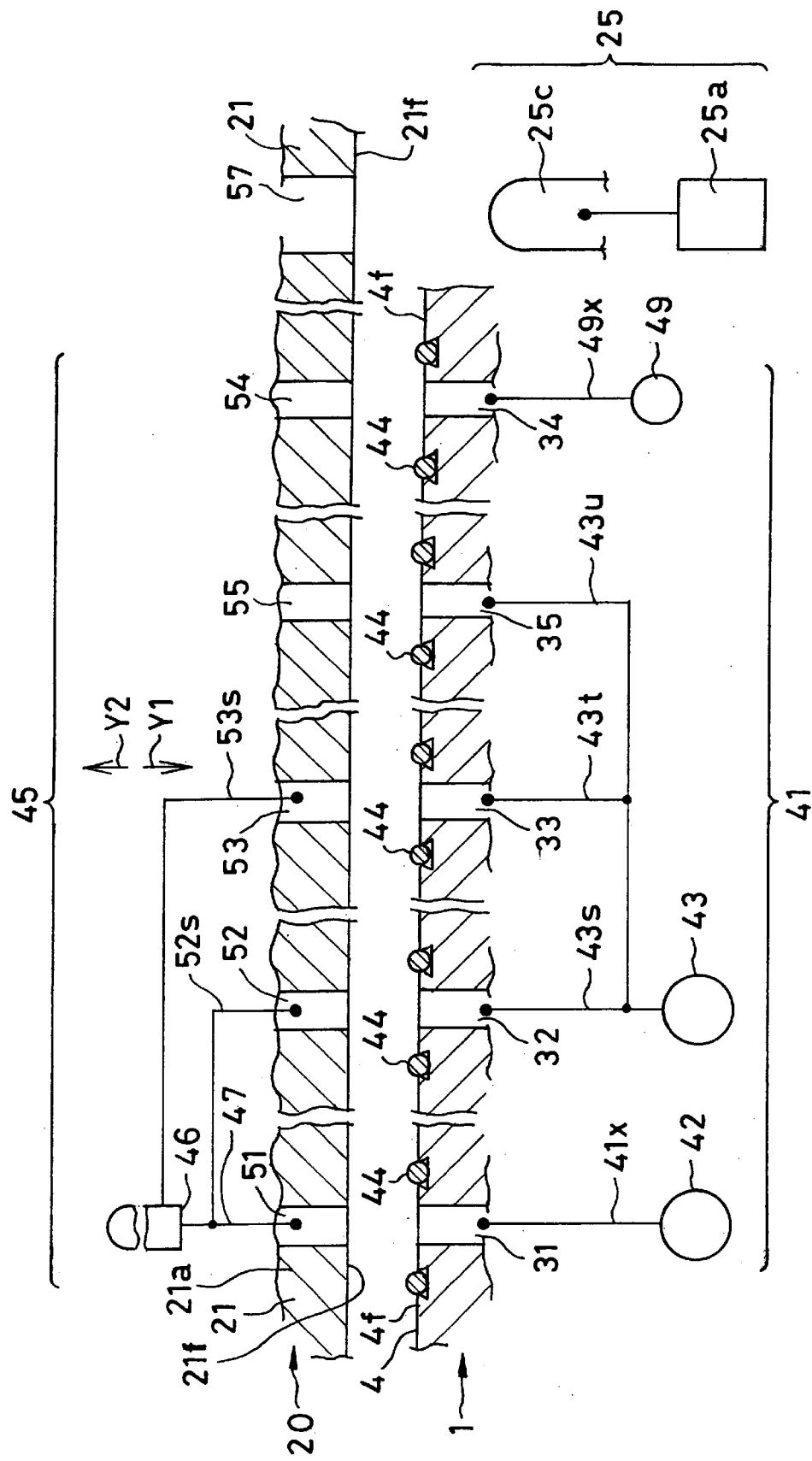
FIG. 5 is a cross sectional view illustrating a state immediately before a fixed die base of a unit is loaded on a loading surface of a base frame.
Figure 6:
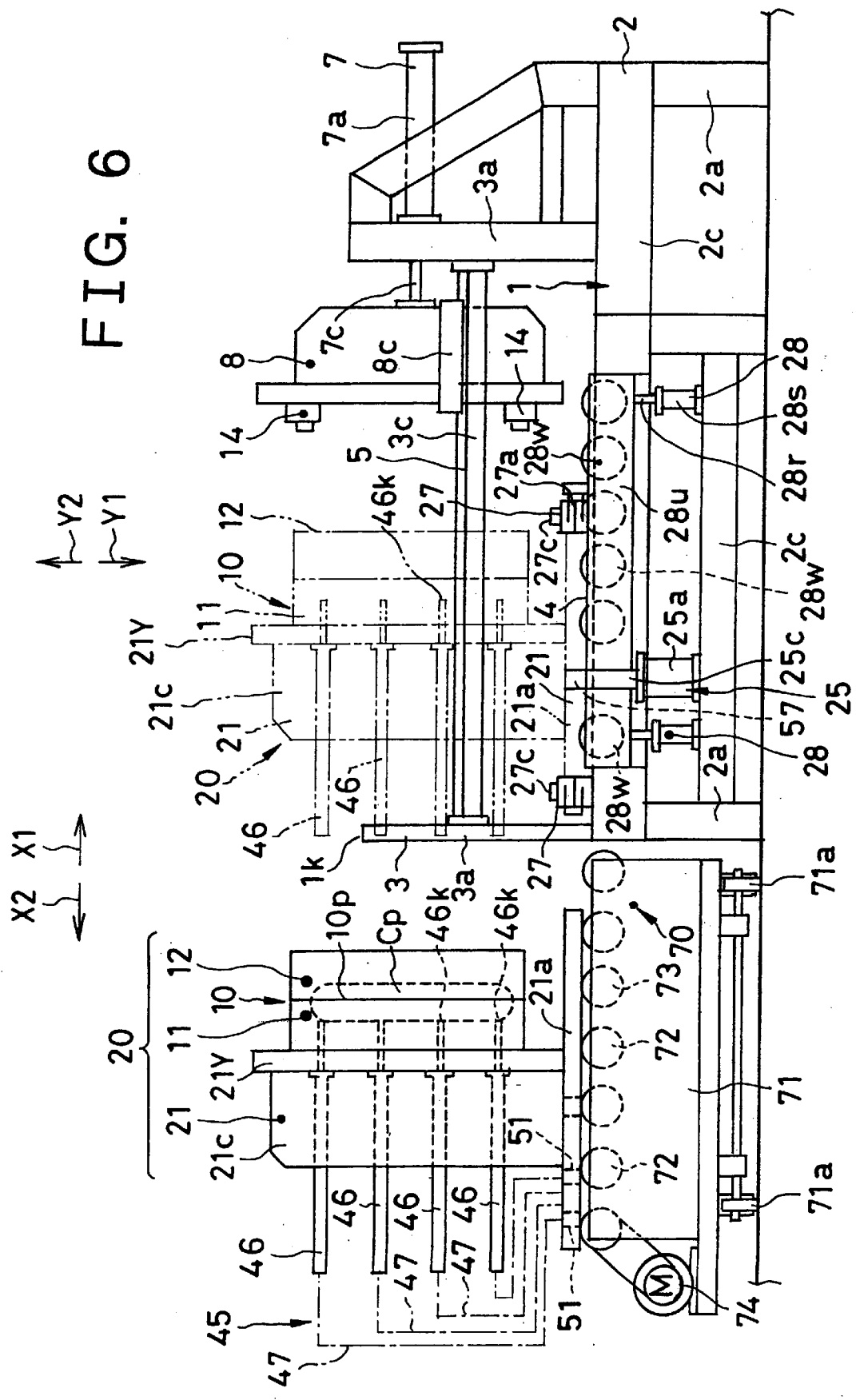
FIG. 6 is a schematic side view showing a state wherein the foam molding equipment is in use.
Figure 7:
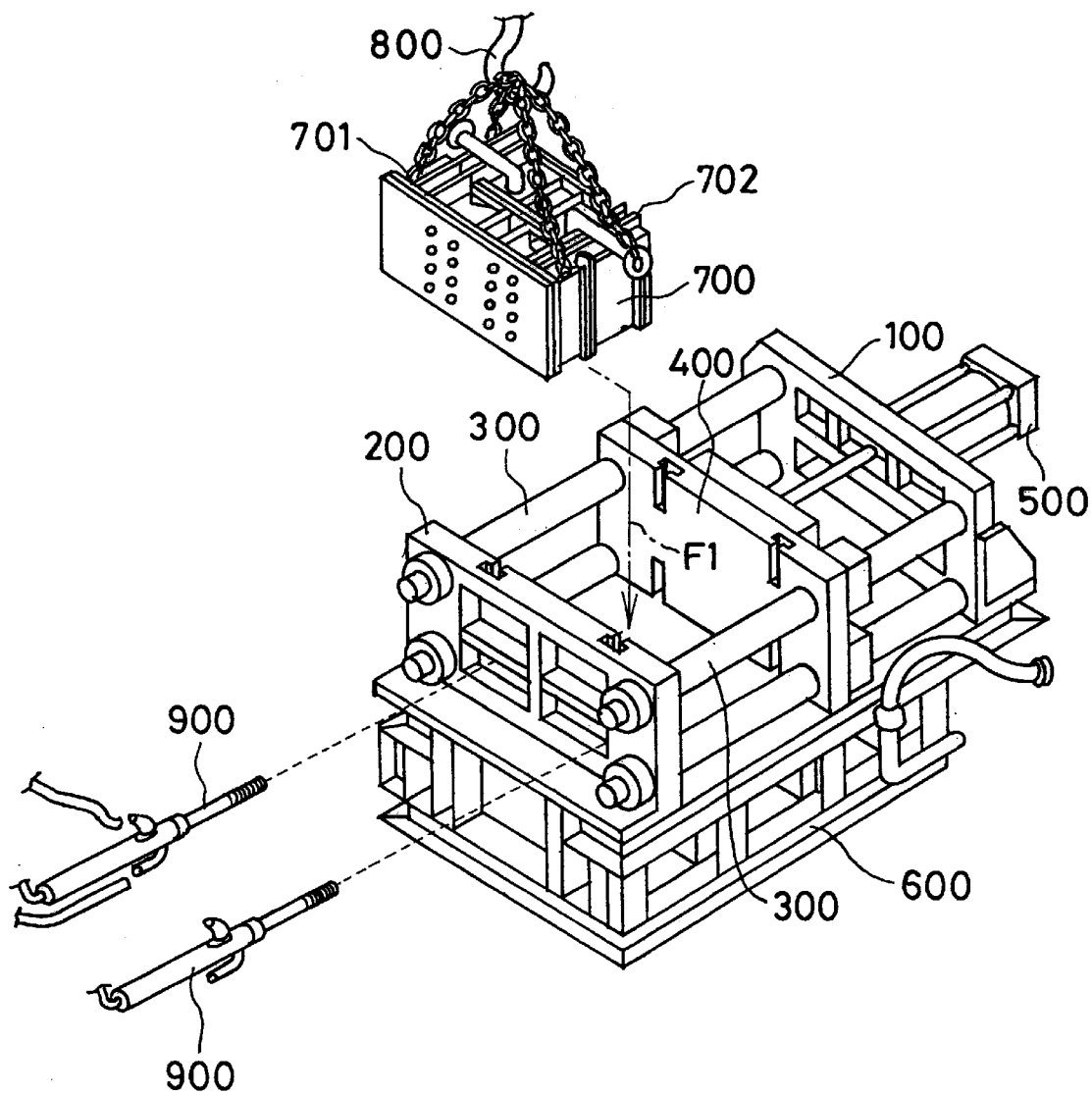
FIG. 7 is a conceptual perspective view schematically showing whole foam molding equipment in the prior art.

Moreover, as shown in FIG. 5, the base frame 1 is provided with a supply system 41 on the base frame side which serves to supply resin particles, air and the like. The supply system on the base frame side 41 is provided, by taking the aim of supply of resin particles into consideration, with a path 41x used to connect a resin particle source 42 which is a storage tank for resin particles installed outside of the foam molding equipment to a first material passage 31. In addition, the supply system on the base frame side 41 is provided, also by taking the aim of supply of air into consideration, with a path 43s used to connect an air source 43 installed outside of the foam molding equipment to a first charging air passage 32. Furthermore, the supply system on the base frame side 41 is provided with a path 43t used to connect the air source 43 to a first actuating air passage 33 and a path 43u used to connect the air source 43 to a first pilot passage 35. As shown in FIG. 5, a path 49x is also provided to connect a drain exhaust port 49 installed outside of the foam molding equipment to a first drain passage 34.

Also, in the present embodiment, as shown in FIG. 5, ring-shaped sealing materials 44 used to seal first material passage 31 around are placed on the loading surface 4 of the base frame 1. With continuous reference to FIG. 5, the sealing materials (O-rings) 44 are also placed at a first charging air passage 32, first actuating air passage 33, first drain passage 34, first pilot passage 35 to seal around each of them. As seen in FIG. 5, the sealing materials 44 project upward from the top face of the loading surface 4 and they are subject to elastic deformation which secures sealing properties accordingly.

Furthermore, in the present embodiment, as is discernible from FIG. 1, a unit in/out opening 1k is formed in the base frame 1. The unit in/out opening 1k is placed between two upper frames 3 and is open on the side of the base frame 1 and formed on the opposite side of the movable die base 8 so that it faces the movable die base 8. As a result, the unit in/out opening 1k extends along the directions of the arrows X1 and X2.

Moreover, in this embodiment, a detachable unit 20 is provided.

The unit 20 can be detached from the base frame 1 via the in/out opening 1k in the direction of the arrows X2 and X1.

The unit 20 is so constructed that molding dies 10 comprising a stationary die 11 and a movable die 12 are attached to a fixing die base 21. As shown in FIG. 1, the fixing die base 21 includes a horizontal floor member 21a loaded on the loading surface 4 of the base frame 1 and an erected portion 21c being vertical to the horizontal floor member 21a. Therefore, the side of the fixed die base 21 is of a reverse T-shaped configuration, thereby giving stability during movement thereof.

With continuous reference to FIG. 5, a plurality of second material passages 51 are formed in a lower face 21f of the horizontal floor member 21a of the fixing die base 21 of the unit 20 as well as second charge air passage 52, second actuating air passage 53, second drain passage 54 and second pilot passage 55 are opened therein. Further, a plurality of positioning months 57 are opened on the lower face 21f of a horizontal floor 21a of a fixing die base 21.

As is discernible from FIG. 5, when the unit 20 is lowered in the direction of the arrow Y1 and adequately loaded on the loading surface 4, a second material passage 51 communicates with a first material passage 31, second charge air passage 52 with first charge air passage 32, second actuating air passage 53 with first actuating air passage 33, second drain passage 54 with first drain passage 34, second pilot passage 55 with first pilot passage 35, respectively.

As is also discernible from FIG. 6, the unit 20 is provided with a supply system on the unit side 45. The supply system on the unit side 45 has, taking the aim of supply of resin particles into consideration, a plurality of charging guns 46 (for example, 16 pcs) used to supply resin particles to a molding cavity Cp of the molding dies 10 and plurality a connecting tube 47 used to couple each of the charging guns 46 to each of second material passages 51. As is discernible from FIG. 6, an end 46k of the charging gun 46 communicates with the molding cavity Cp of the molding dies(die set) 10. Moreover, as shown in FIG. 5, the supply system on the unit side 45 is provided with paths 52s and 53s to connect air passages 52 and 53 to the charging gun 46.

As shown in FIG. 2, the base frame 1 is provided with a pipe clamp 21x. The pipe clamp 21x has a steam supply port 21s and a cooling water supply port 21t. When the unit 20 is adequately loaded, the pipe clamp 21x moves in the vertical direction in FIG. 2, the steam supply port 21s is connected to a steam passage (not shown) installed on the unit 20 and the cooling water supply port 21t is connected to a cooling water passage (not shown).

Heated steam transferred from the steam supply port 21s is supplied into a stationary die 11 through the steam passage (not shown) to heat the stationary die 11, whereas a part of the heated steam is supplied to the molding cavity Cp of the molding dies 10. Similarly, cooling water supplied from the cooling supply port 21t is supplied into the stationary die 11 via a cooling passage (not shown) to cool the stationary die 11, whereas a part of the cooling water is supplied to the molding cavity Cp of the molding dies 10.

Though not shown in the drawings, a movable die 12 and a movable die base 8 are also provided with a steam supply port and a cooling water supply port having the same functions as above.

As shown in FIG. 6, the base frame 1 is provided with a die arrangement device 70. The die arrangement device 70 comprises a travelling base 71 having a travelling wheel 71a, a roller table 73 consisting of a plurality of driving rollers 72 installed on the travelling base and a driving motor 74 to rotate and drive the roller table 73. The height of the roller table 73 is so constructed that it corresponds to that of a roller table 28w of the base frame 1. Its purpose is to achieve a smooth interchange of the unit 20.

METHOD FOR USE ACCORDING TO EMBODIMENTS

The methods for using the present embodiment are hereinafter described.

(1) Firstly, a method for attaching the molding dies 10 to foam molding equipment is described herein. As shown in FIG. 6, molding dies 10 composed of a stationary die 11 and a movable die 12 are attached to a support portion 21Y of the stationary die 21 to preliminarily construct a unit 20. In this condition, because a connecting pin attached to the movable die 12 fits into a connecting hole attached to the stationary die 11 to be connected while a pair of hooks (not shown) fitted to both sides of the movable die 12 is connected to a pin (not shown) fitted to the stationary die 11, both the stationary die 11 and the movable die 12 will not be easily detachable.

Then, the assembled unit 20 is set on the roller table 73 of the die arrangement device 70. As shown in FIG. 6, the die arrangement device 70 with the unit 20 loaded is fitted to a side portion of the base frame 1 so that it faces a lower frame 2.

As a result, the unit 20 faces the unit in/out opening 1k. In this condition, a drive motor 74 of the die arrangement device 70 is driven to move the unit 20 on the roller table 73 of the die arrangement device 70 in the direction of the arrow X1 and to transfer it to a roller table 28w of the elevating portion 28u of the base frame 1.

In this case, preferably, a transfer portion 16 shown in FIG. 2 is activated to connect the connecting nail 16s to the portion 21u to be connected of the fixed die base 21 in order to draw the unit 20 to the direction of the arrow X1. When the whole unit 20 is transferred to a specified position of a roller table 28w, the unit positioner 25 is activated to elevate a positioning pin 25c in the direction of the arrow Y2 and insert it into a positioning port 57 of the stationary die base 21 of the unit 20. Thus, exact positioning of the unit 20 on the loading surface 4 of the base frame 1 is performed.

With reference to FIG. 6, a unit elevating means 28 is subsequently activated to have the elevating portion 28u with the unit 20 loaded come down by a specified amount in the direction of the arrow Y1. By doing this, a horizontal floor member 21a of the fixed die base 21 of the unit 20 is adequately loaded on the loading surface 4. Then, a unit connecting means(unit connector) 27 is activated to clamp the horizontal floor 21a of the fixed die base 21 of the unit 20 with the clamp nail 27c in order to fix the unit 20 to the loading surface 4 in a detachable manner.

Furthermore, the die opening/closing mechanism 7 is activated to move the movable die base 8 in the direction of the arrow X2 and the movable die base is put on the rear side of the movable die 12 of the unit 10. In this condition, a support portion 14 of the movable die is activated so as to attach the movable die 12 to the movable die base 8 in a detachable manner. Subsequently, the die opening/closing mechanism 7 is moved reversely to have the movable die base 8 together with the movable die 12 come back in the direction of the arrow X1 to separate the movable die from the stationary die 11 and to open the molding dies 10. Thus, the die arrangement procedures for the molding dies 10 are completed.

(2) Heated foaming of resin particles are hereinafter described. As described above, after the attachment of the molding dies 10 to the foam molding equipment, the die opening/closing mechanism 7 is activated to move the movable die base 8 together with the movable die 12 forward in the direction of the arrow X2 and to close the molding dies 10. Then, the die clamping means 9 is activated to securely clamp the stationary die 11 and the movable (lie 12. As hereinabove described, when the unit 20 is adequately loaded on the loading surface 4, as is discernible from FIG. 5, as a second material passages 51 of the unit 20 communicates with first material passages 31 of the base frame 1, resin particles transferred from the resin particle source 42 together with air are supplied, through first material passage 31 of the base frame 1, second material passages 51 and further a charging gun 46, to the molding cavity Cp of the molding dies 10. Therefore, both the supply system 41 of the base frame and the supply system 45 on the unit side constitutes a resin particle charging portion.

Also, when the unit 20 is adequately loaded on the loading surface 4, as is discernible from FIG. 5, as a second air passage 52 of the unit 20 communicates with first material air passage 32 of the base frame 1, air used to assist in supplying resin particles is supplied, through first air passage 32, second material air passage 52 to charging gun 46.

Moreover, because a second actuating air passage 53 of the unit 20 communicates with a first actuating air passage 33 of the base frame 1, actuating air used to activate a charging gun 46 is supplied through a first actuating air passage 33 and a second actuating air passage 53.

Then the unit 20 is adequately loaded, a pipe clamp 21x moves in the vertical direction in FIG. 2, the steam supply port 21s is connected to a steam path (not shown) displaced on the unit 20 and the cooling water supply port 21t is connected to a cooling water path (not shown) displaced on the unit 20.

During the process of heated foaming of resin particles, the supplied heated steam passes through the steam supply port 21 and the steam path (not shown) and via an inside part of the molding dies 10 and is finally discharged through a second drain passage 54 and a first drain passage 34 to a drain exhaust port 49.

The supplied cooling water passes through the cooling supply port 21t and the cooling water path (not shown) and via an inside part of the molding dies 10 and is finally discharged through the second drain passage 54 and the first drain passage 34 to a drain exhaust port 49 as well.

After the completion of heated (thermal) foaming of resin particles and the formation of foaming products, the die opening/closing mechanism 7 moves reversely to cause the movable die base 8 together with the movable die 12 to retract in the direction of the arrow X1 to separate the movable die 12 from the stationary die 11 and, as a result, the molding dies 10 is opened, thus allowing foamed products to be taken out.

(3) Finally, a method for taking out the molding dies 10 from the foam molding equipment is described hereinafter. To take out the molding dies 10, an operation work being basically reverse to those for attaching the molding dies 10 described in above item (1) is done.

That is, when both the movable die 12 and stationary die 11 are opened, the die opening/closing mechanism 7 is activated to move the movable die base 8 together with the movable die 12 forward in the direction of the arrow X2 so that the stationary die 11 contacts closely with the movable die 12 and, as a result, both dies are coupled together (in pair). In this condition, the movable support portion 14 is relieved.

Moreover, the unit connecting means 27 is unclamped and the unit 20 is unfixed from the loading surface 4. This allows the unit 20 to move. Then, the unit elevating means 28 is activated to elevate the elevating portion 28u in the direction of the arrow Y2 and lift the unit 20 so that the unit 20 is floated from the loading surface 4. The roller table 28w is used to move the unit 20 in the direction of the arrow X2 and to transfer the unit 20 from the roller table 28w to a roller table 73 of the die arrangement running equipment 70. Thus, the removal of the unit 20 is completed.

The embodiments have the following meritorious advantages.

In accordance with the embodiment described above, the foam molding equipment is so constructed that the fixed die base 21 is separated from the base frame 1 and that the molding dies 10 comprising the stationary die 11 and the movable die 12 is attached in advance to the fixed die base 21 to form a unit 20. To interchange the molding dies 10, the unit 20 is loaded on the loading surface 4 of the base frame 1. Then, the unit 20 on the loading surface 4 is fixed on the base frame 1 by clamping a unit connecting means 27. By doing this, the unit 20 is adequately loaded on the base frame 1.

Thus, in the embodiment, because the molding dies 10 composed of the stationary die 11 and the movable die 12 is preliminarily attached to the fixed die base 21 to form the unit 20 and the unit 20 can be loaded, as a whole, on the base frame 1, the molding dies 10 can be exchanged more easily, time required for the replacement thereof can be reduced advantageously and productivity thereof is more improved when compared to the conventional art products. Therefore, even in the case of large-sized foaming or molding products and of upsized and heavier molding dies 10 (for example, a size in several meters x several meters), time required for replacement of the molding dies 10 is advantageously reduced.

In case of using several kinds of molding dies 10, preferably, a fixed die base 21 is prepared for every pair of molding dies 10 and a plurality of units 20 are arranged by preliminarily attaching the molding dies 10 to each fixed die base 21.

Moreover, in the embodiment, the fixed die base 21 has a horizontal floor portion 21a to be loaded on the loading surface 4 of the base frame 1 and an erected portion 21c which is vertical to the horizontal floor portion 21a, and the side of the fixed die base 21 is of reverse T-shaped configuration.

Thus, a configurational stability in the fixed die base 21 and finally the unit 20 can be achieved. That is, during the movement of the unit 20 with the molding dies 10 attached to the fixed die base 21, the unit 20 can be kept stable. Therefore, time required for exchange of the molding dies 10 can be advantageously reduced.

Additionally, in the embodiment, when the unit 20 is adequately loaded on the loading surface 4 of the base frame 1, as is discernible from FIG. 5, a supply system on the unit side 45 of the unit 20 is automatically connected to a supply system on the base frame side 41 and both communicate with each other.

In the embodiment, therefore, though the unit 20 is detachable from the base frame 1, resin particles supplied from the resin particle source can be supplied, through the supply system on the base frame 41 and the supply system on the unit side 45, to the molding cavity Cp of the molding dies 10.

Thus, the embodiment of the present invention provides advantages in abolishing or simplifying troublesome operation of manually connecting the supply system on the unit 45 to the supply system on the base frame side 41 of the base frame 1, in achieving an easier exchange of the molding dies 10 as well as in more shortening time required for the exchange thereof.

Also, as is discernible from FIG. 5, when the unit 20 is lifted in the direction of the arrow Y2 and removed from the loading surface 4 of the base frame 1, pipes of the supply unit 45 on the unit side are automatically detached from those of the supply system on the base frame 1.

Thus, the embodiment of the present invention provides advantages in abolishing or simplifying troublesome operation of manually removing the supply system on the unit 45 from the supply system on the base frame side 41 of the base frame 1, in achieving an easier exchange of the molding dies 10 as well as in more shortening time required for the exchange thereof.

In other words, in this embodiment, when the unit 20 is adequately loaded on the loading surface 4 of the base frame 1, as shown in FIG. 5, the second material passage 51 disposed on the lower face 21f of the fixed die base 21 of the unit 20 communicates with a first material passage 31 which is opened on the loading surface 4. Resin particles can be supplied, in an advantageous manner, through the first material passage 31 and the second material passage 51, to the molding cavity Cp accordingly.

Also, in this embodiment, when the unit 20 is adequately loaded on the loading surface 4 of the base frame 1, as shown in FIG. 5, sealing materials 44 come to adhere tightly to the lower face 21f of the fixed die base 21 of the unit 20. This provides a full sealing between the first material passage 31 and second material passage 51. Therefore, leakage and the like of resin particles can be prevented advantageously and resin particles can be supplied smoothly through the first material passage 31 and the second material passage 51. As is discernible from FIG. 5, the sealing between air passages 32 and 52, between air passages 33 and 53, and between drain passages 34 and 54 is made possible.

In addition, as is discernible from FIG. 5, in the embodiment, positioning of the unit 20 on the loading surface 4 is achieved by the engagement between a positioning pin 25c of a unit positioner 25 and a positioning port 57 of the fixed die base 21. Thus, after the completion of positioning the unit 20, as shown in FIG. 6, the unit 20 is lowered by a unit elevating means 28 in the direction of the arrow Y1 to load the fixed die base 21 of the unit 20 on the loading surface 4 of the base frame 1. This allows the unit 20 which is exactly positioned to be loaded on the loading surface 4 of the base frame 1 in an advantageous manner.

Following technical idea can be understood from what is described above:

Foam molding equipment wherein a unit in/out opening portion (1K) which extends along the die opening/closing direction is formed on the opposite side of a movable die base 8 which also faces the movable die base 8 and the unit 20 is taken in or out in the die opening/closing direction to a loading surface 4.

Foam molding equipment wherein a stationary die and movable die making up molding dies 10, in a closed state, are installed on a movable die base 8 and die clamping means 9 used to fasten the fixable die and movable dies is constructed independently from a die opening/closing mechanism 7.

Foam molding equipment wherein a charging gun 46 used to charge resin particles into a molding cavity of the molding dies 10 is preliminarily attached to a unit 20.

Foam molding equipment wherein a guide rail 5 used to guide a movable die base 8 in its movement is installed on both sides of a movable die base 8 and disposed at an approximately intermediate position between the highest and lowest ends of a movable die base 8.

Foam molding equipment wherein a die arrangement device 70 on which a unit 20 is loaded is accessible to a loading surface 4 of the base frame 1.

What is claimed is:

1. Foam molding equipment for producing foamed products by foam molding resin particles charged in a molding cavity of molding dies, the foam molding equipment comprising:

molding dies composed of a stationary die and a movable die with a molding cavity;

a fixed die base to which said stationary die is attached;

a movable die base to which said movable die is attached;

a die opening/closing mechanism which moves said movable die base together with said movable die in die opening and die closing directions of said movable die; and a base frame in which said fixed die base, said movable die base and said die opening/closing mechanism are installed, wherein the equipment is so constructed that said fixed die base is separable from said base frame;

said molding dies are detachably attached to said fixed die base to form a unit;

said base frame is provided with a horizontally and two-dimensionally extending loading surface on which is received said fixed die base of said unit and a unit connecting means to fix, in a detachable manner, said unit loaded on said loading surface to said base frame.

2. Foam molding equipment defined in claim 1 wherein said fixed die base has a horizontal floor member to be loaded on the loading surface of said base frame and an erected portion being vertical to said horizontal floor member, the fixed die base having a substantially reverse T-shaped configuration as viewed from a side face of the fixed die base.

3. Foam molding equipment defined in claim 1 wherein a resin particle charge portion is provided to charge resin particles into the molding cavity of said molding dies and said resin particle charge portion comprises a supply system on a base frame side to which resin particles are supplied from a resin particle source, the supply system being attached to said base frame, and a supply system on a unit side which is attached to said unit and which communicates with the supply system on said base frame when said unit is loaded on the loading surface of said base frame.

4. Foam molding equipment defined in claim 3 wherein the supply system on said base frame side of said resin particle charge portion has a first material passage which is opened on the loading surface of said base frame, the supply system on said unit side of said resin particle charge portion has a second material passage which is opened on a lower face of the fixed die base of said unit and which communicates with the first material passage when said unit is loaded on said loading surface, and said resin particle charge portion is used to supply resin particles through said first material passage and second material passage to the molding cavity of said molding dies.

5. Foam molding equipment defined in claim 4 wherein a circumferential part of said first material passage on the loading surface of said base frame is provided with sealing materials used to seal the lower face of said fixed die base of said unit against the loading surface of said base frame when said unit is loaded on the loading surface of said base frame.

6. Foam molding equipment defined in claim 1 wherein said base frame is provided with a unit positioner connected to said unit used to perform positioning of said unit on said loading surface and with a unit elevating means used to support said unit during elevation thereof and to lower said unit after completion of positioning thereof and to load said fixed die base of said unit on the loading surface of said base frame.

7. Foam molding equipment for producing foamed plastics by foam molding resin particles charged in molding dies, the foam molding equipment comprising:

molding dies composed of a stationary die and a movable die with a molding cavity;

a fixed die base to which said stationary die is attached;

a movable die base to which said movable die is attached;

a die opening/closing mechanism which moves said movable die base together with said movable die; and a base frame for loading said molding dies, said opening/closing mechanism being provided on said base frame, said base frame possessing a horizontally oriented loading surface, said fixed die base being positioned on the horizontally oriented loading surface of said base frame and being separable from said loading surface of said base frame;

said molding dies are detachably attached to said fixed die base to form a unit;

said base frame is provided with a unit connector to fix said unit on said base frame in a detachable manner.

8. Foam molding equipment as defined in claim 7 wherein a space which opens in the horizontal direction and in which the unit is installed in a detachable manner is formed in front of the movable die base on the base frame, the unit is taken in or out of said space in the horizontal direction.

9. Foam molding equipment defined in claim 7 wherein a die clamping module used to clamp the stationary and movable dies is constructed independently from the die opening/closing mechanism.

10. Foam molding equipment defined in claim 7 wherein a charging gun used to charge resin particles into the molding cavity is preliminarily attached to the unit.

11. Foam molding equipment defined in claim 7 including a guide rail to guide the movable die base during movement, said guide rail being installed on both sides of the movable die base and disposed at an approximately intermediate position between highest and lowest ends of the movable die base.

12. Foam molding equipment defined in claim 7 including a die arrangement device on which the unit is loaded, said die arrangement device being alignable with the loading surface of the base frame for loading the unit on the base frame.

13. Molding equipment comprising:

a molding die set composed of a stationary die and a movable die that is movable relative to the stationary die;

a first die base to which said stationary die is attached;

a second die base which is movable and to which said movable die is attached;

a die opening/closing mechanism which moves said second die base together with said movable die in die opening and die closing directions of said movable die; and a base frame in which the first die base, said second die base and said die opening/closing mechanism are installed, wherein the equipment is free of tie bars and is so constructed that the first die base is separable from said base frame;

wherein said molding dies are detachably attached to the first die base to form a unit, and said unit is loaded, in a detachable manner, on a horizontally extending loading surface of the base frame.

14. Foam molding equipment for producing foamed products by foam molding resin particles charged in a molding cavity of molding dies comprising:

molding dies composed of a stationary die and a movable die with a molding cavity;

a fixed die base to which said stationary die is attached, said fixed die base having a bottom surface;

a movable die base to which said movable die is connected;

a die opening/closing mechanism which moves said movable die base together with said movable die in die opening and die closing directions of said movable die; and a base frame in which said fixed die base, said movable die base and said die opening/closing mechanism are installed, said fixed die base being separable from said base frame;

said molding dies being detachably attached to said fixed die base to form a unit;

said base frame possessing a horizontally extending loading surface on which said unit is removably loaded so that said bottom surface of said unit rests on and is supported by said loading surface of said base frame, said base frame including a unit connecting means to fix, in a detachable manner, said unit loaded on said loading surface to said base frame.

15. Foam molding equipment according to claim 1, wherein when said fixed die base is loaded onto said base frame, said loading surface is substantially coextensive with said fixed die base of said unit.

* * * * *